Aug. 12, 1930.  L. J. McKONE  1,772,565

PISTON FOR AUTOMOBILE ENGINES

Filed Nov. 24, 1926

INVENTOR.
LEO J. McKONE.
BY HIS ATTORNEYS.

Patented Aug. 12, 1930

1,772,565

UNITED STATES PATENT OFFICE

LEO J. McKONE, OF MINNEAPOLIS, MINNESOTA

PISTON FOR AUTOMOBILE ENGINES

Application filed November 24, 1926. Serial No. 150,537.

This invention relates to a piston for an internal combustion engine and particularly to an automobile engine piston. The piston in the modern automobile engine is now usually made of metal and several expansible rings are placed in grooves therein for maintaining a tight fit with the cylinder wall. In the movements of the piston, however, the skirt or the portion below the rings often comes in contact with the cylinder walls, especially if the movement of the piston is somewhat irregular. This irregular movement of the piston or a movement out of the rectilinear line occurs from the wearing of the various parts of the piston and usually causes an impact between the piston and cylinder wall, commonly known as "piston slap". It often happens that after the engine has been standing for quite a period, that there is practically no oil between the piston and the cylinder wall. When the engine is started, the piston will make several reciprocations before the same is well lubricated. This running of the engine with insufficient lubrication and the piston slap above mentioned, results in a scuffing or marring of the piston.

It is an object of this invention, therefore, to provide a piston structure which will effectively prevent piston slap.

It is another object of the invention to provide a piston structure which will at all times insure sufficient lubrication of the piston and will also prevent scuffing of the piston.

It is another object of the invention to provide a piston for an internal combustion engine such as an automobile engine which has in addition to the usual ring or rings used, circumferential portions in its walls made of wood, which portions are disposed at either side of the wrist pin.

It is more specifically an object of the invention to provide a piston for an automobile engine having circumferentially extending segmental and comparatively wide rings of wood, one above the wrist pin and one adjacent the bottom of the skirt of the piston.

These and other objects and advantages of the invention will be fully set forth in the following description made in connection with the accompanying drawings, in which like reference characters refer to similar parts throughout the several views and in which:—

Figure 1:
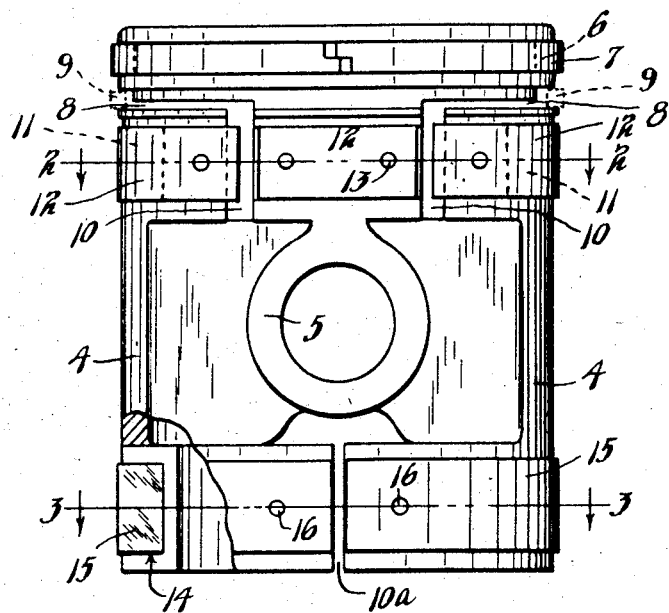
Fig. 1 is a side view of a piston embodying the invention, a portion thereof being broken away and another portion shown in vertical section.
Figure 2:
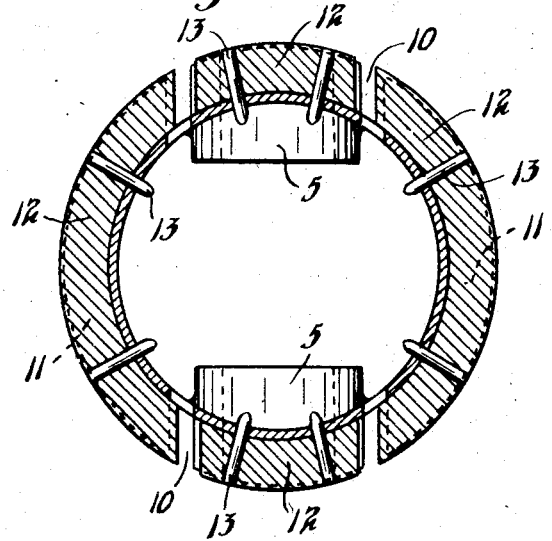
Fig. 2 is a horizontal section taken on line 2—2 of Fig. 1, as indicated by the arrows.
Figure 3:
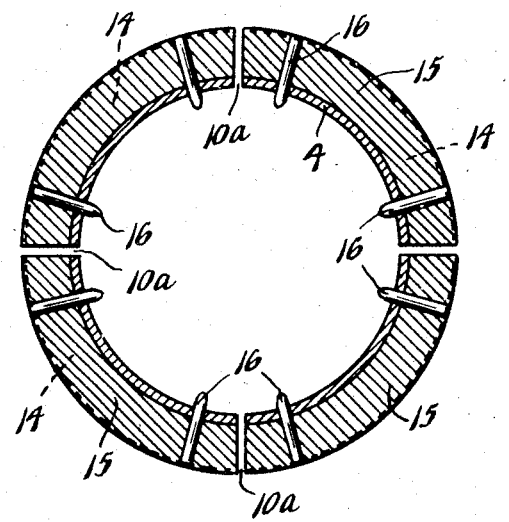
Fig. 3 is a horizontal section taken on line 3—3 of Fig. 1, as indicated by the arrows.

Referring to the drawings, a piston of the usual type for an automobile engine is shown, comprising the skirt portion having at each side thereof the wrist pin bosses 5 bored to receive the usual wrist pin. The piston is provided with a circumferential groove 6 adjacent its upper end having therein an expansible ring 7 of the usual type. The ring also has the lower groove 8 adapted to receive an oil ring 9 indicated in dotted lines. The piston illustrated is of the type having circumferentially and vertically extending slots 10 at each side of the wrist pin bosses 5 and the piston is also shown as having the vertical slots 10ª at the bottom of the skirt dividing the lower portion thereof into segments.

In accordance with the present invention, the skirt is made of a somewhat thickened upper portion between the groove 8 and the bosses 5 in which portion a wide groove 11 is formed. A ring is disposed in groove 11 composed of a plurality of segments 12. The segments 12 are held in place by a plurality of pins 13 driven therethrough and tightly fitting in holes in the skirt 4. The segments 12 and pins 13 are made of wood and while various kinds of wood may be used, in practice maple has proven to be very efficient. The skirt 4 is also formed with a somewhat thickened portion below the bosses 5 and adjacent the lower end of the skirt, which portion has a groove 14 formed therein adapted to receive a comparatively wide ring also formed of segments 15. The segments 15 are held in place by pins 16 extending therethrough and through alined holes in the skirt 4. The pins 13 and 16 may be slightly tapered. The rings 15 and pin 16 are also of wood such as maple.

In operation the piston will be assembled in the engine as usual, to reciprocate in the cylinder. The rings 11 and 15 will be arranged to closely engage the cylinder wall. The piston and cylinder are lubricated in the usual manner. The wood absorbs a large amount of oil and this oil is always retained therein so that a lubricated surface is provided even if the engine has been standing idle for long periods. The rings 11 and 15 being of wood, it is impossible for them to scratch or mar the cylinder wall. The rings also have very little friction with the side of the cylinder and it is possible to keep them in close engagement with the cylinder wall. This cooperates in guiding the piston and keeping the same in a rectilinear path. There is thus substantially no lateral movement of the piston and the piston slap is prevented. The scuffing of the engine is also eliminated and the consequent wear on the cylinder is also eliminated. When a piston slaps or moves in an irregular path, it usually wears the cylinder wall into an elliptical shape, causing leakage past the piston. This is eliminated in the present piston. As stated above, there is also always sufficient oil present in the wood to furnish lubrication in starting the engine. The segments of the wooden rings can also be adjusted outward when desired, by placing shims in the rear thereof. This may be done if the wooden rings wear appreciably, although in practice very little wear occurs on these rings.

From the above description it is seen that applicant has provided a very simple and efficient structure of a piston to be used in an internal combustion engine, and particularly in an automobile engine. The pistons are easily and inexpensively constructed. The same have been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claim.

What is claimed is:—

A piston for an automobile engine having the usual ring grooves at the upper end thereof, metallic piston rings in said grooves, said piston having a wide groove adjacent the lower end of the skirt thereof, a segmental wooden ring disposed in said latter groove, pins extending through the segments of said wooden ring radially thereof into the body of said piston, the outer ends of said pins being disposed flush with the outer surface of said ring.

In testimony whereof I affix my signature.

LEO J. McKONE.